Aug. 18, 1953     W. E. FRECH     2,649,100
DISHWASHING MACHINE
Filed April 28, 1949     4 Sheets-Sheet 2
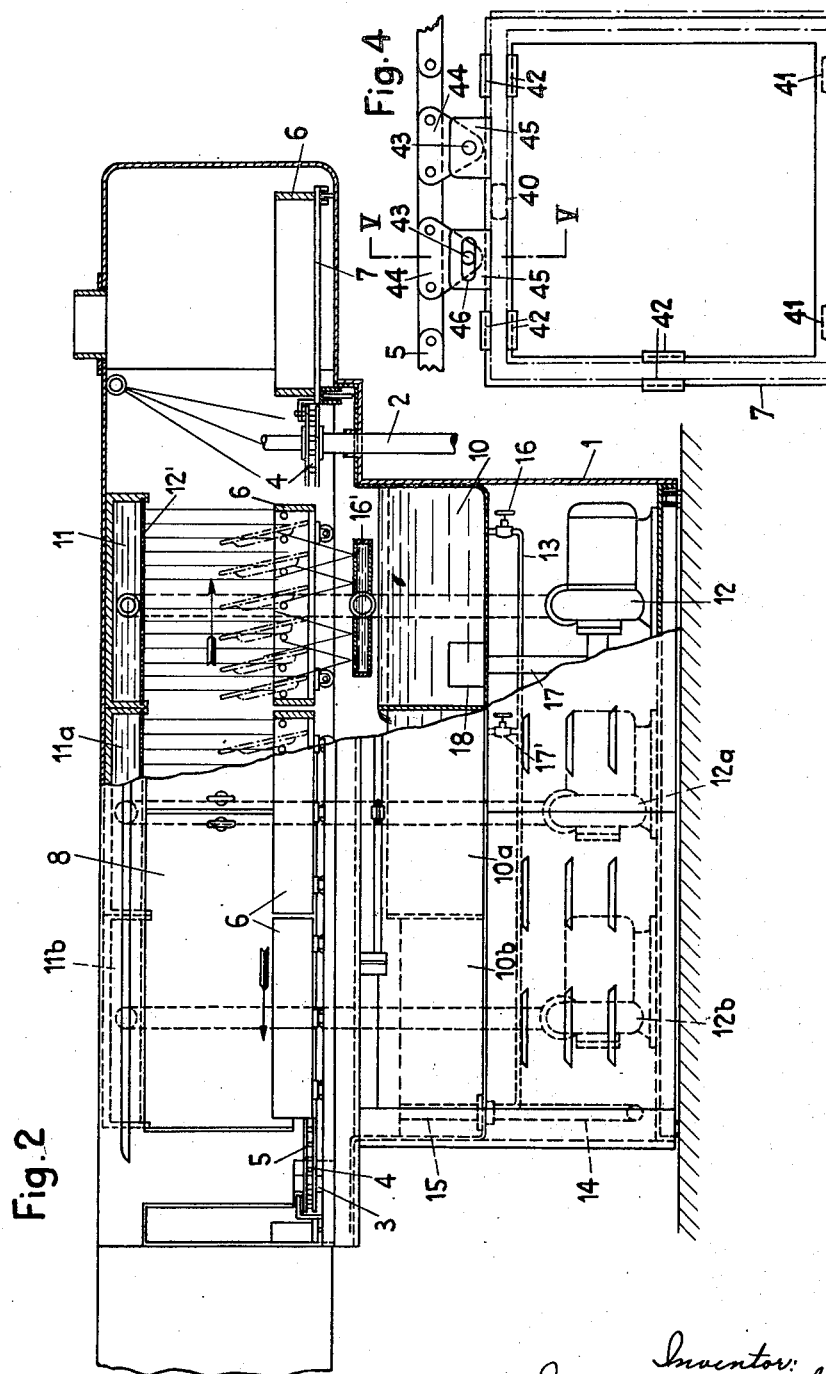
Inventor:
Walter Emil Frech,
by Singer, Ehlert, Stern & Carlberg
Attorneys.

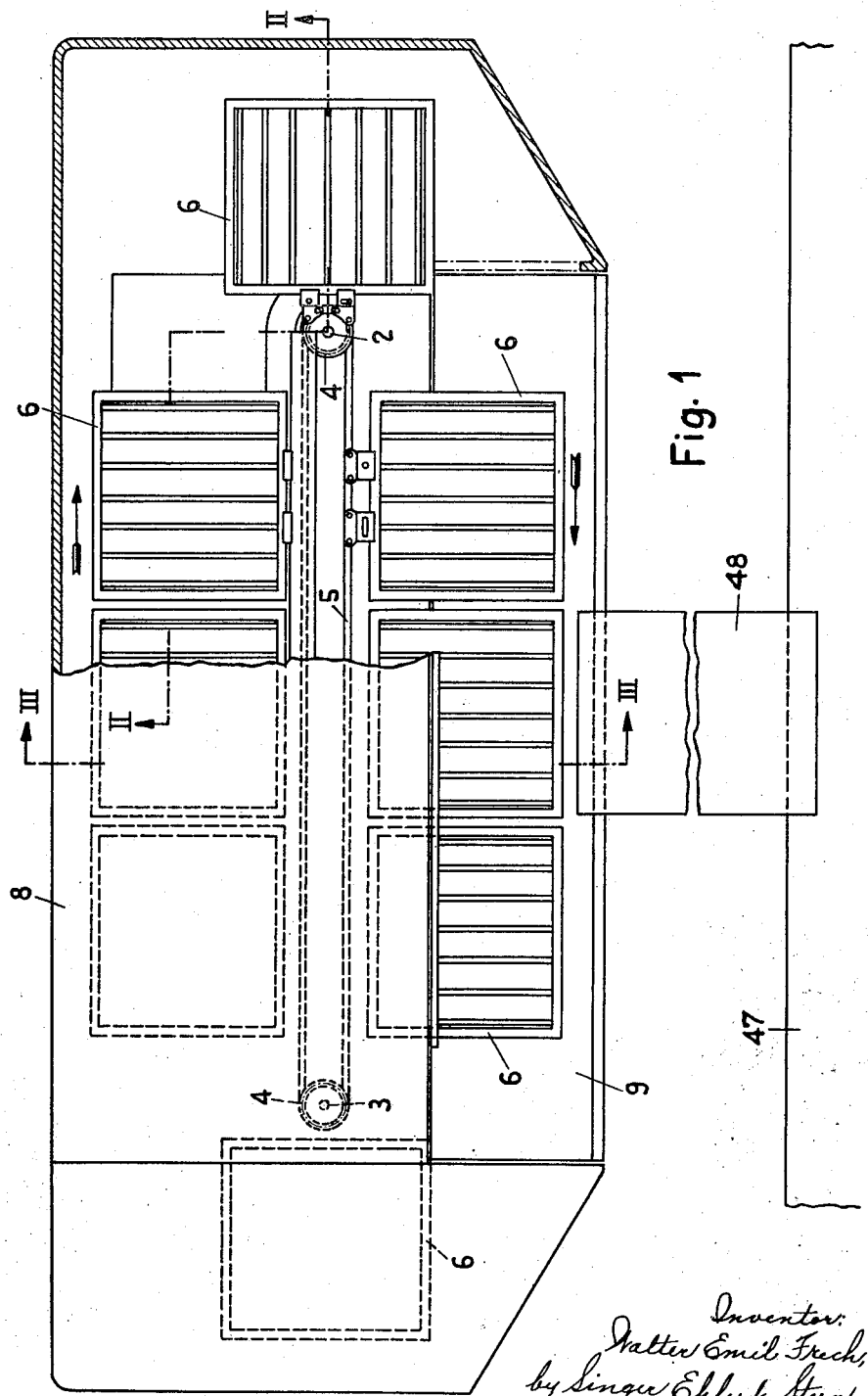

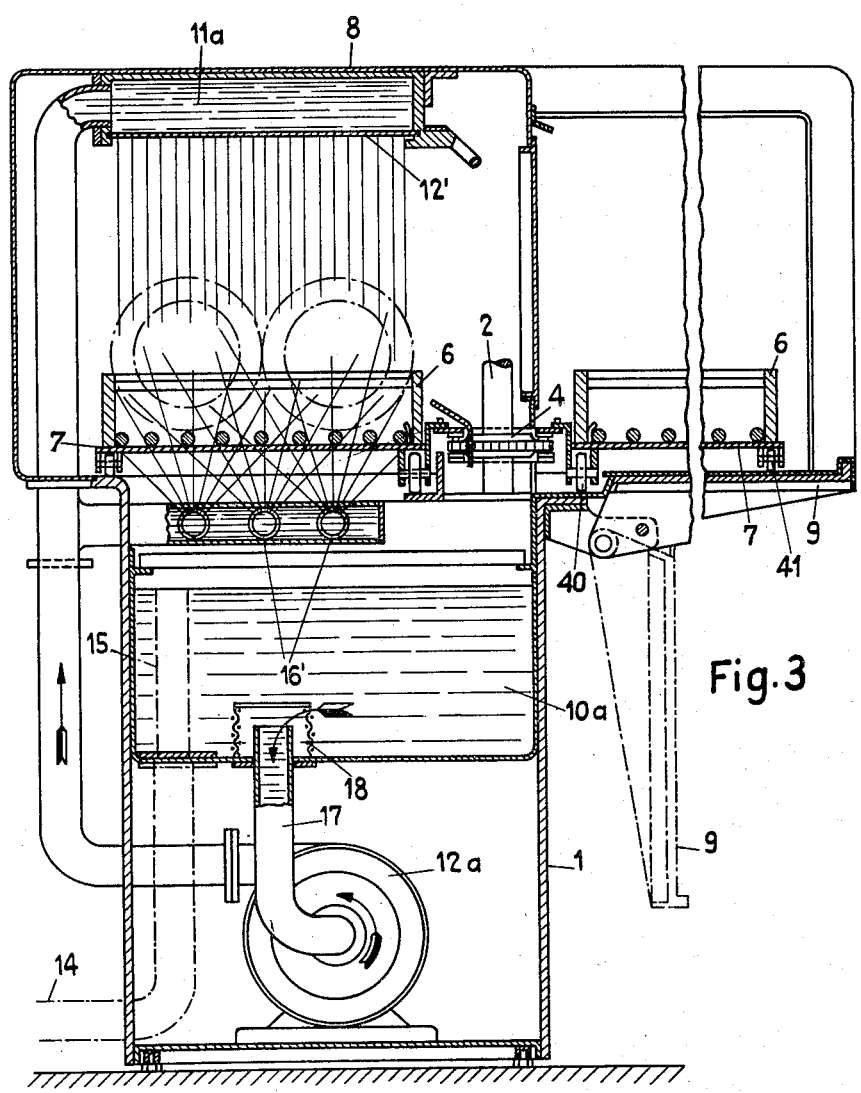
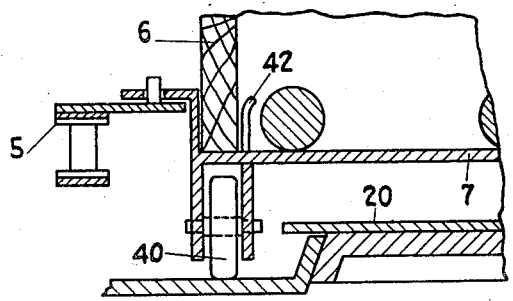

Aug. 18, 1953     W. E. FRECH     2,649,100
DISHWASHING MACHINE

Filed April 28, 1949     4 Sheets-Sheet 4

Patented Aug. 18, 1953

2,649,100

UNITED STATES PATENT OFFICE 2,649,100

DISHWASHING MACHINE

Walter Emil Frech, Lucerne, Switzerland

Application April 28, 1949, Serial No. 90,073
In Sweden December 2, 1948

2 Claims. (Cl. 134—125)

The object of the present invention is a dishwashing machine with an endless conveyor member, for instance a chain, arranged in a horizontal plane, said member serving to convey the crockery, for instance through a spray chamber. According to the invention crockery baskets borne on carriages are detachably connected to the conveyor unit, said baskets being moved along with and by the conveyor member. At least a part, located in front of the spray chamber, of the path or track of the crockery baskets can be swung out of place, whilst within the chamber, below a gap arranged between the tracks of the rollers, at least one trough accommodating the rinsing water is provided which trough is connected by a pipe to the spraying device arranged above said trough, a motor-driven pump being incorporated in said pipe.

The annexed drawing shows two embodiments of the invention. In the drawing:

Fig. 1 is a view in plan, partly in section,

Fig. 2 is a front elevation, partly in section along the line II—II in Fig. 1,

Fig. 3 is a cross section along the line III—III in Fig. 1,

Fig. 4 is a detail on a scale enlarged in relation to Fig. 1,

Fig. 5 is a section long the line V—V in Fig. 4,

Figure 6:
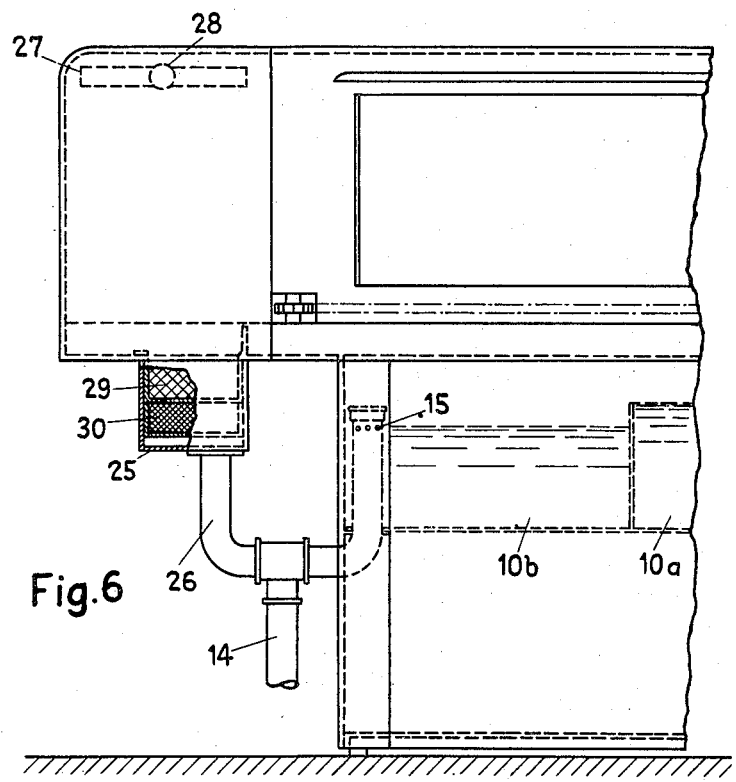
Figs. 6 and 7 illustrate, in front elevation in plan, a portion of a second embodiment of the invention.

The dish-washing machine is provided with a housing 1 in which two shafts 2 and 3 are rotatably mounted. The shaft 2 projects from the bottom of the housing and is driven by a motor not shown in the drawing. A chain wheel 4 is mounted on each of the shafts 2 and 3, a conveyor chain 5 being led over said chain wheels. The carriages 7 bearing the crockery baskets 6 are detachably connected to said chain. Said carriages roll on rollers 40, 41 along the surface of the table. As can be seen from Fig. 5, the crockery baskets 6 lie directly on the carriages 7. Fixing of the carriage to the crockery basket is achieved by means of, for instance, clips 42 arranged on at least two sides of the carriage. The provision of the clips 42 on only two mutually abutting sides of the carriage enables crockery baskets to be used which need not be exactly of the same dimensions as the carriage and, for instance, as shown by a line of dots and dashes in Fig. 4, may project slightly beyond the edges of said carriage.

As shown in Fig. 4, the chain 5 is provided with drag pins 43 mounted on lugs 44, the latter being in turn secured to the chain 5. The drag pins 43 engage in lugs 45 of the carriage 7, two pins 43 being provided for each carriage and co-operating with suitably arranged lugs 45. One of said lugs is provided with a round aperture corresponding to the pin 43, whilst the next following lug is provided with a slot 46. This method of constructing the lugs 45 is necessary to enable the carriages to travel round the chain wheels 4.

The chain leads the crockery baskets through a spray chamber 8 in which the crockery is sprayed down in the manner described hereunder. The portion 9, lying in front of the spray chamber 8, of the path or track of the crockery baskets is at least in part hinged so as to be capable of being swung upwards or downwards. After the leading crockery baskets and the appurtenant carriages have been removed, the portion 9 may be pivoted so that, after opening of the panel shown above 4 in Fig. 3, it becomes possible to approach near to the spray chamber for the purpose of cleaning the machine and, in particular, the interior of the spray chamber. The portion 9 may be constructed in one or a plurality of parts. A safety device, not shown in the drawing, is so connected to the portion 9 that when said portion 9 is pivoted out of place the electrical circuit to the drive motor of the shaft 2 is interrupted, so that it is not possible inadvertently to set the chain 5 in motion.

For controlling the chain 5, control members, not shown in the drawing, are expediently so provided that they automatically interrupt the movement of the chain when the number of baskets provided for has been introduced into the spray chamber. A pedal, not shown in the drawing, is expediently provided for switching on the drive motor of the shaft 2. The arrangement is expediently such that the movement is started up by the pedal and shut off by a switch. The dish-washing machine described affords the advantage that, apart from loading the crockery into the crockery baskets and discharging the latter, no labour is required on the part of the operating personnel. The shaft 2 may be driven by hand instead of by motor. As is shown by Fig. 1, a table 47 may, for instance, be provided at the side of the housing 1, one part of which table accommodates the clean crockery and the other the soiled crockery. Between the table 47 and the portion 9 at least one slidable slab or plate 48 is provided, the dirty crockery and the clean crockery in the crockery baskets being pushed across said slab 48.

Inside the spray chamber, and to be precise underneath the track or path of the crockery baskets, at least one trough 10 is provided. In the embodiment shown (Fig. 2), three troughs 10, 10a and 10b are provided. Above each trough is a spraying device 11, 11a and 11b respectively. The trough 10 is connected by a discharge pipe 17 to a pump 12 which conveys the water from trough 10 up into the spraying device 11 whence it is sprayed through a perforated sheet 12' or the like in a uniform spray on to the crockery moving past below. In the same way the trough 10a is connected through a pump 12a to the spraying device 11a. Trough 10b is likewise connected to the spraying device 11b through the pump 12b. The troughs 10 and 10a are connected by a pipe 13 to a waste-water pipe 14 into which the overflow pipe 15 provided in the trough 10b empties. Between trough 10 and the crockery basket conveyed over it an additional spraying device 16' is arranged. The machine functions as follows:

During the intermittent motion of the chain 5, the carriages 7 located in front of the spray chamber are loaded with crockery baskets which are subsequently moved into the spray chamber. The soiled crockery is subjected to a first cleansing by the spray device 11b. Then the particular crockery basket concerned moves along below the spraying device 11a, where the crockery is further cleansed. Between the spraying devices 11 and 16' the crockery is washed completely clean, whereupon it emerges from the spray chamber at the right end. As can be seen, the water from each trough is led to the spraying device lying above said trough and returns from there to the trough. The troughs are preferably so connected to each other that each successive trough in the direction of travel of the crockery baskets contains a somewhat higher level of water than the previous trough, so that from the last trough 10 the water can overflow via an overflow spout or the like into the trough 10a and from that trough into the trough 10b, from which it passes via the overflow pipe 15 into the discharge pipe 14. Experience has shown that the water in trough 10 contains practically no further impurities, so that the crockery last sprayed with this water is, on leaving the spray chamber, in a clean condition. According to the peculiarities of the crockery to be washed, the facility exits of not putting all the spraying devices into operation. This is most simply achieved by shutting down some of the pumps so that the corresponding spraying devices do not operate. It is possible, for instance when washing drinking glasses, to shut down spraying devices 11b and 11a and to work with spraying device 11 only. Valves 16, 17' are built into the pipe 13 so that the troughs 10 and 10a may be emptied to enable them to be cleaned out. Each pump is connected to the trough located above it by means of a pipe 17, the outlet of the latter being surrounded by a sieve 18 to prevent impurities from entering the pump. The hinged portion 9 is provided with a cover plate 20 which leads the water dripping off the crockery baskets 6 back to the troughs.

Figure 7:
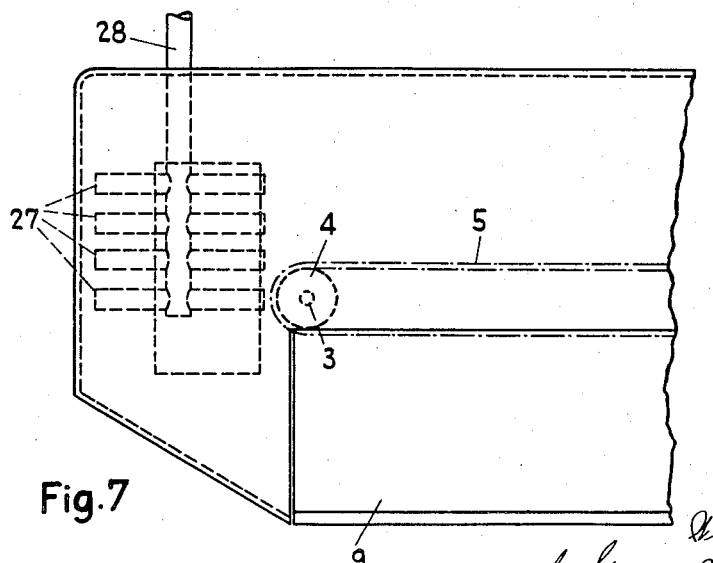

According to the second embodiment, as shown in Figs. 6 and 7, a trough 25 is provided in front of the trough 10b, above which the crockery baskets are conveyed. Said trough 25 contains two sieves or strainers with perforations of different mesh and is permanently connected by a pipe 26 to the discharge pipe 14. Above the trough 25 is a spraying device 27 connected to a cold water supply pipe 28. The crockery passing below the spraying device 27 is subjected to a first cleansing by said spraying device 27, the food remnants adhering to said crockery running off into the sieves 29 and 30, whilst the waste water is removed through the pipes 26 and 14. The sieve or strainer 29 retains the coarser and the sieve or strainer 30 the finer food residues. These residues may be used up in any of the usual ways, for instance as fodder for pigs. This preliminary spraying results in the water in trough 10b no longer being soiled to the same extent as in the case of the first embodiment.

I claim:
1. In a dish-washing machine comprising a spraying device, a horizontal feed chain loop having a portion thereof adjacent said spraying device, polygonal carriages connected to the chain loop, and polygonal dish baskets, the combination therewith of means connecting each basket to a carriage, said means comprising clips on only two adjacent sides of the carriage for yieldingly embracing only two adjacent sides of the basket.

2. In a dish-washing machine, a spraying device, a horizontal feed chain loop having a portion thereof adjacent said spraying device, polygonal carriages connected to the chain loop, polygonal dish baskets, clips on two adjacent sides of said carriage for yieldingly embracing two adjacent sides of said basket, lugs secured to said chain loop, drag pins secured to the lugs, and other lugs secured to the carriage and provided with apertures for receiving said drag pins, one of said apertures being elongated in a direction parallel with the chain loop.

WALTER EMIL FRECH.

References Cited in the file of this patent

UNITED STATES PATENTS

| Number | Name | Date |
|---|---|---|
| 1,009,223 | Cochrane | Nov. 21, 1911 |
| 1,045,079 | Prunier et al. | Nov. 19, 1912 |
| 1,207,720 | Dilg | Dec. 12, 1916 |
| 1,259,653 | Masterman | Mar. 19, 1918 |
| 1,276,007 | Bausman | Aug. 20, 1918 |
| 1,495,473 | Fitzgerald | May 27, 1924 |
| 1,512,918 | Forsgard | Oct. 28, 1924 |
| 1,871,054 | Hartley | Aug. 9, 1932 |
| 1,952,568 | Schapp et al. | Mar. 27, 1934 |
| 2,057,950 | Howison | Oct. 20, 1936 |
| 2,235,386 | Rueckert | Mar. 18, 1941 |
| 2,314,048 | Ladewig | Mar. 16, 1943 |
| 2,328,504 | Smith | Aug. 31, 1943 |

FOREIGN PATENTS

| Number | Country | Date |
|---|---|---|
| 492,004 | Great Britain | Sept. 13, 1938 |
| 622,041 | France | May 21, 1927 |